United States Patent [19]

Tomimoto et al.

[11] 4,167,750
[45] Sep. 11, 1979

[54] COLOR-DIFFERENCE SIGNAL MODIFYING APPARATUS

[75] Inventors: Tetsuo Tomimoto, Osaka; Yoshitomi Nagaoka, Neyagawa; Reiichi Sasaki, Hirakata, all of Japan

[73] Assignee: Matsushita Electric Industrial Co., Ltd., Osaka, Japan

[21] Appl. No.: 836,904

[22] Filed: Sep. 26, 1977

Related U.S. Application Data

[63] Continuation of Ser. No. 657,626, Feb. 12, 1976, abandoned.

[30] Foreign Application Priority Data

Feb. 20, 1975 [JP] Japan .................................. 50/21748
Aug. 18, 1975 [JP] Japan ................................ 50/100417

[51] Int. Cl.² .......................................... H04N 9/535
[52] U.S. Cl. ................................................ 358/27
[58] Field of Search ................................. 358/26–29, 358/23, 30

[56] References Cited

U.S. PATENT DOCUMENTS

| 3,107,275 | 10/1963 | Chatten | 358/27 |
| 3,705,259 | 12/1972 | Lovely et al. | 358/29 |
| 3,919,712 | 11/1975 | Izumisawa et al. | 358/29 |

Primary Examiner—John C. Martin
Attorney, Agent, or Firm—Wenderoth, Lind & Ponack

[57] ABSTRACT

A color-difference signal modifying apparatus for modifying a color-difference signal in a color television receiver. The apparatus gives to a color-difference signal a non-linear characteristic which approximates a theoretical characteristic for completely eliminating both luminance and chromaticity errors of a reproduced color. The apparatus is constituted by a threshold signal producing means which is supplied with a luminance signal to produce a threshold signal proportional to the luminance signal, and a gain reduction means which is supplied with the color-difference signal to decrease the gain to remove a specific portion of the color-difference signal which exceeds the threshold signal level.

6 Claims, 15 Drawing Figures

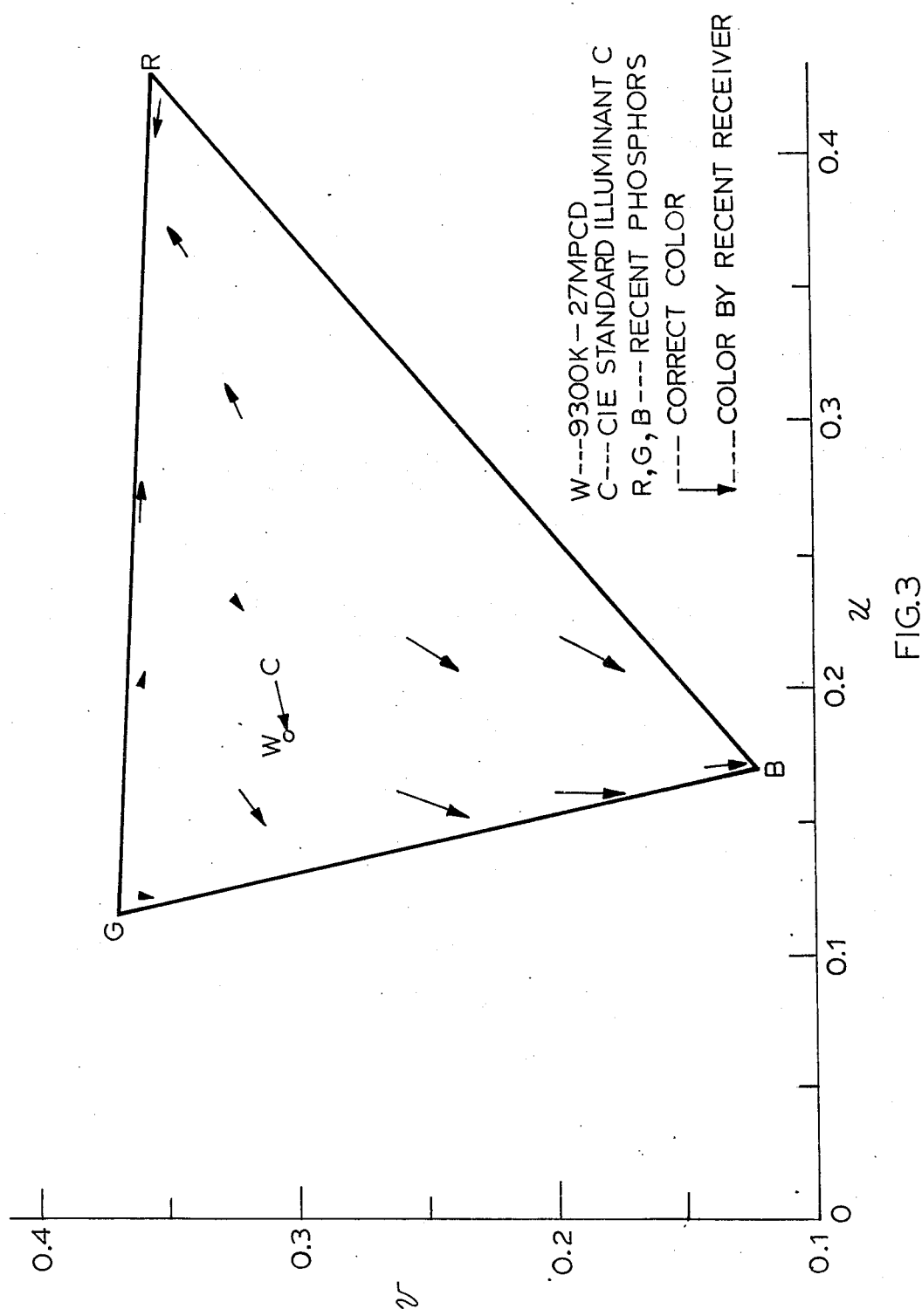

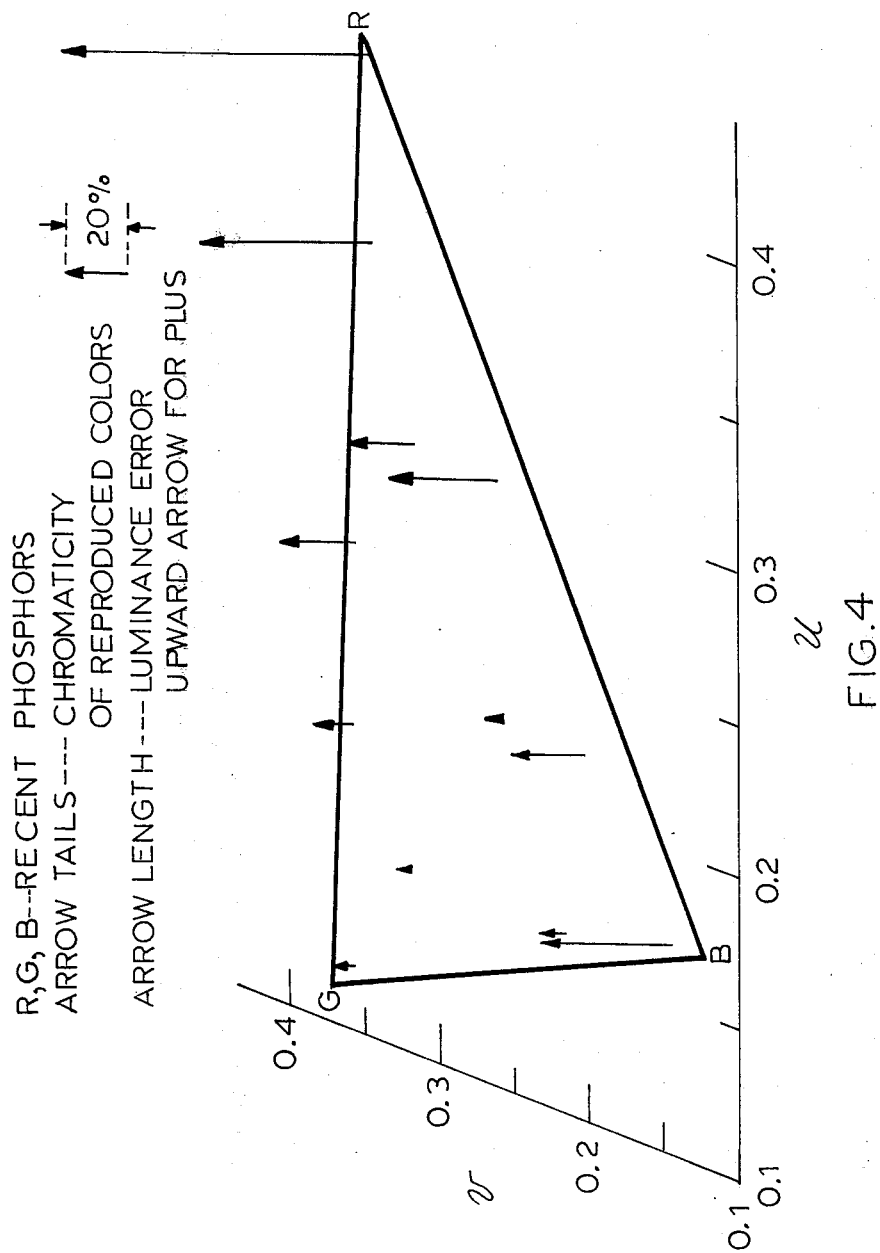

COLOR-DIFFERENCE SIGNAL MODIFYING APPARATUS

This is a continuation of application Ser. No. 657,626, filed Feb. 12, 1976 and now abandoned.

This invention relates to a color television receiver, and more particularly to a color-difference signal modifying apparatus for reducing both the luminance errors and chromaticity errors of a reproduced color.

Chromaticities of phosphors applied to recent color picture tubes are much different from those of the primary color picture tubes defined in the NTSC television system. Chromaticity errors of a reproduced color caused by this difference are almost corrected by appropriate demodulating angles and gains of color-difference signal demodulators, as taught by N. W. Parker in a paper entitled "An Analysis of the Necessary Decoder Correction for Color Receiver Operation with Non-standard Receiver Primaries" in the U.S. magazine IEEE Transactions on Broadcast and Television Receivers, April 1966. However, Parker's linear correction method is essentially ineffective for reducing luminance errors of a reproduced color. In order to compensate for the defect of linear correction, several means have been proposed to decrease a portion of an extremely large color-difference signal which does not contribute to the chromaticity fidelity but increases luminance errors. Therefore, these means have no effect on unsaturated colors.

It is an object of this invention to provide a color-difference signal modifying apparatus for modifying a color-difference signal in a color television receiver, which apparatus eliminates luminance errors of a reproduced color.

Another object of this invention is to provide a color-difference signal modifying apparatus which decreases luminance noise transmitted through the chrominance channel.

A further object of this invention is to provide a color-difference signal modifying apparatus which improves the chromaticity of a reproduced color.

These and other objects are achieved according to this invention by providing a color-difference signal modifying apparatus comprising a threshold signal producing means which is supplied with a luminance signal and produces a threshold signal which is proportional to said luminance signal, and a gain reduction means to which is supplied the color difference signal and which is supplied with said threshold signal to decrease the gain so as to remove a specific portion of said color-difference signal which exceeds said threshold signal level.

Details of this invention will be apparent from the following description taken in connection with the accompanying drawings, in which:

FIG. 3 is a chromaticity diagram of colors reproduced by conventional demodulators having linear correction added thereto in receivers having the recent phosphors and reference white of 9300K+27MPCD;

FIG. 4 is a diagram showing luminance errors caused by the linear correction as shown in FIG. 3;

Figure 11:
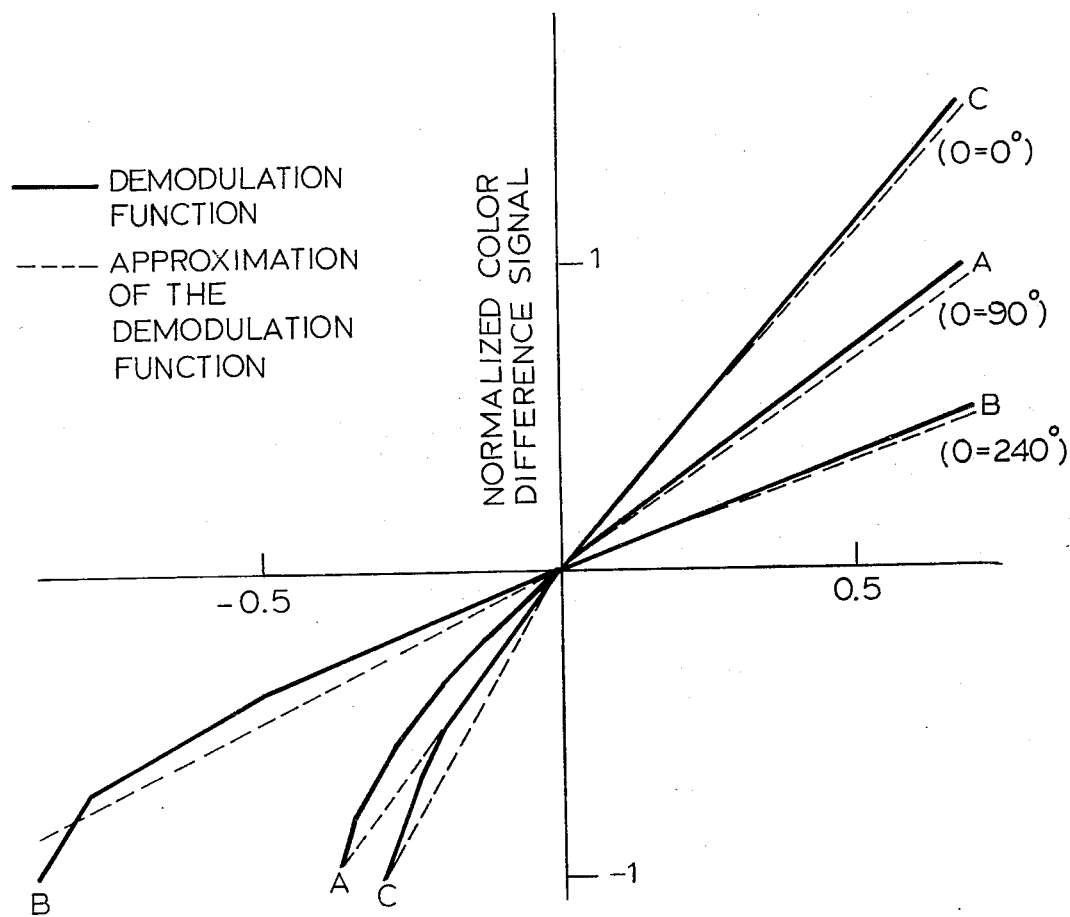
FIG. 11 is a graph illustrating demodulation characteristics required for the color-difference signal demodulators to reproduce an accurate color with respect to both chromaticity and luminance in a receiver having the recent phosphors and the illuminant C as a reference white.
Figure 12:
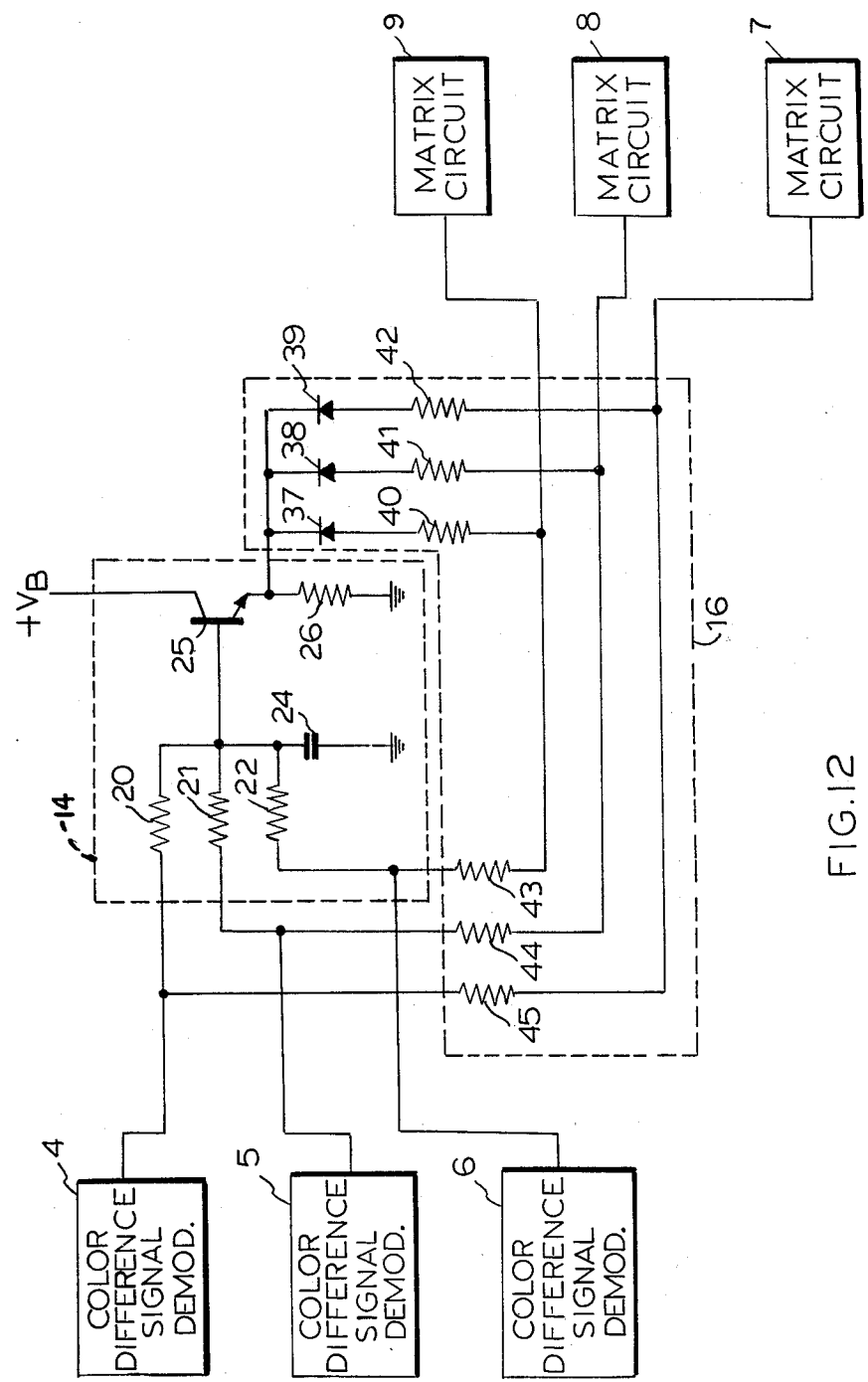
Figure 13:
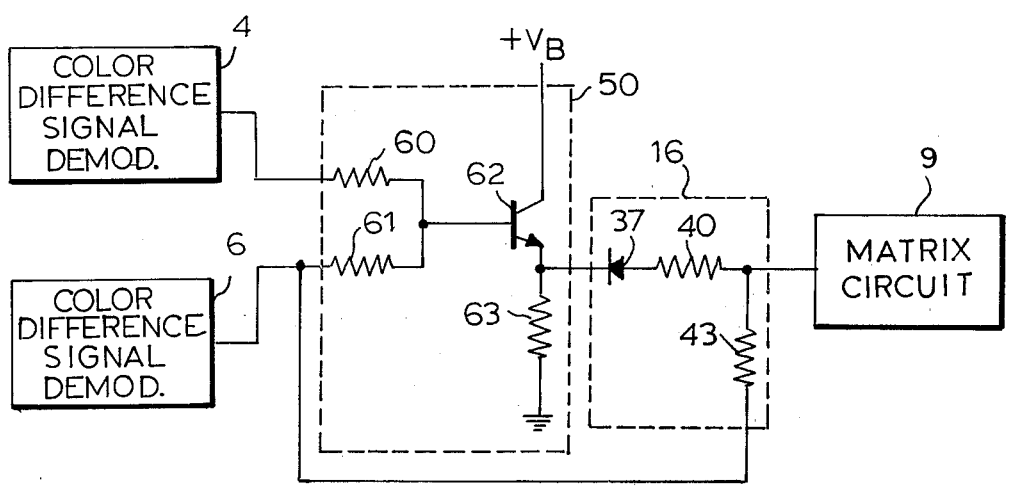

FIG. 12 is a schematic circuit diagram, partially in block form, of a system using another embodiment of a color-difference signal modifying apparatus according to this invention, the demodulation characteristics of which approximate the function shown in FIG. 11; and FIG. 13 is a schematic circuit diagram, partially in block form, of a system using still another embodiment of a color-difference signal modifying apparatus according to this invention which further improves a chromaticity accuracy of a color around bluish green.

Figure 1:
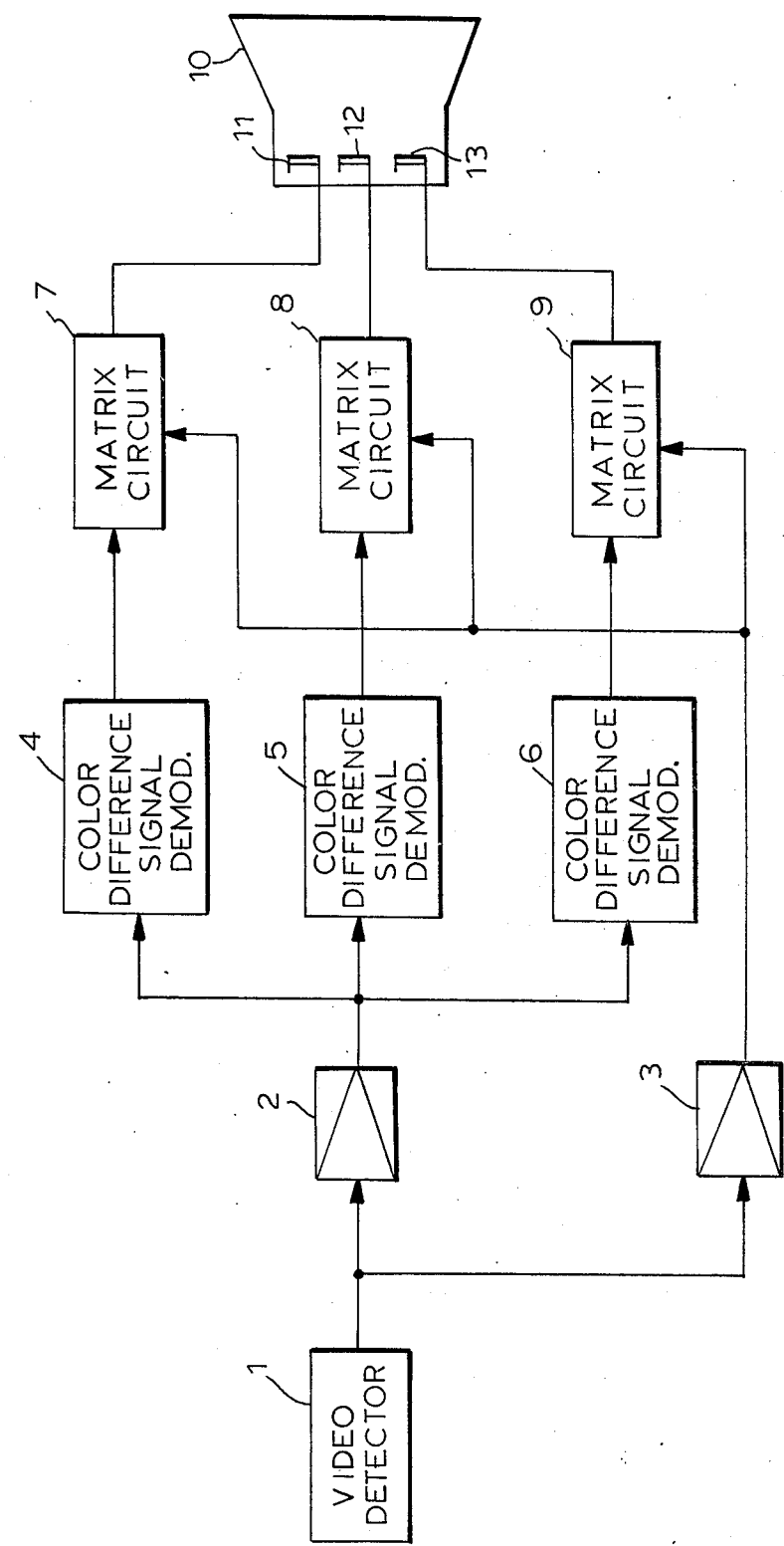
FIG. 1 is a schematic block diagram of a conventional color television receiver.

FIG. 1 is a block diagram of a conventional color television receiver for decoding NTSC television signals. Referring to FIG. 1, a video detector 1 detects from an intermediate-frequency signal a composite video signal which consists of a luminance signal and a carrier chrominance signal. The luminance signal is amplified by a video amplifier 3 and fed to each of three (red, green, and blue) matrix circuits 7, 8 and 9. The carrier chrominance signal is amplified by a chrominance signal amplifier 2, demodulated by red, green and blue color-difference signal demodulators 4, 5, and 6, and fed in the form of color-difference signals to the matrix circuits 7, 8, and 9. Each of the matrix circuits 7, 8, and 9 adds the corresponding color-difference signal to the luminance signal and produces a primary color signal. The primary color signals R, G and B are supplied to a red cathode 11, a green cathode 12, and a blue cathode 13, respectively, so as to energize a picture tube 10. The picture tube 10 converts the primary color signals to light outputs.

In the NTSC television system, the chromaticities of the three primaries and the reference white are defined as shown in the following table.

| Phosphor | X | Y |
| --- | --- | --- |
| R | 0.67 | 0.31 |
| G | 0.21 | 0.71 |
| B | 0.14 | 0.08 |
| white | 0.310 | 0.316 |

| Phosphor | X | Y |
|---|---|---|
| (illuminant C) | | | where X and Y are coordinates on the CIE 1931 (x, y) chromaticity diagram.

In this system, the demodulating angle and gain of each color-difference signal demodulator are also defined as shown in the following table.

| | angle | gain |
|---|---|---|
| R-Y | 90° | 1.147 |
| G-Y | 235.67° | 0.706 |
| B-Y | 0° | 2.046 |

A color television receiver provided with NTSC specified phosphors and white and NTSC specified demodulators is capable of accurate color reproduction.

However, improvement of the luminous efficiency of phosphors which has been made in recent years has brought a chromaticity change toward less saturated colors. Moreover, the reference white in almost all recent receivers has a higher color-temperature than 6774 K, which is the color-temperature of the illuminant C. Typical chromaticities of phosphors and a higher color-temperature reference white in a recent television receiver are shown in the following table.

| Phosphor | X | Y |
|---|---|---|
| R | 0.631 | 0.347 |
| G | 0.268 | 0.585 |
| B | 0.150 | 0.071 |
| white (9300K+27MPCD) | 0.281 | 0.311 |

Figure 2:
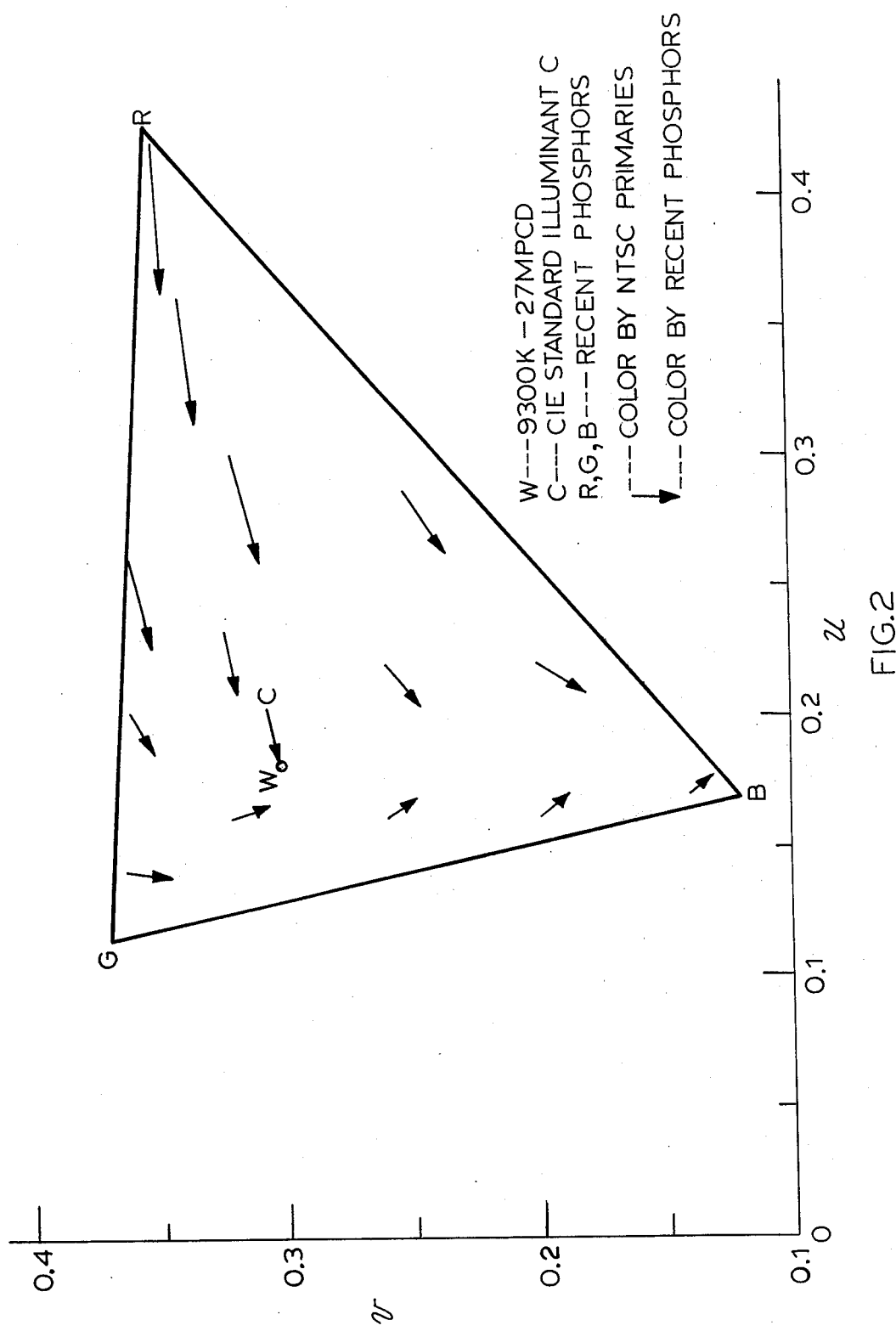
FIG. 2 is a CIE 1960 UCS chromaticity diagram showing chromaticity errors of colors reproduced by systems employing color-difference signal demodulators according to the NTSC standard, recent phosphors and reference white of 9300K+27MPCD.

If the NTSC specified demodulators are used for color reproduction, the recent phosphors and a higher color-temperature white will cause large chromaticity errors of the reproduced colors on the CIE 1960 Uniform-Chromaticity-Scale (UCS) diagram as shown in FIG. 2. But these errors can be decreased by redesign of the color-difference signal demodulators with proper demodulating angles and gains. The specifications for the recent color-difference signal demodulators for the recent phosphors and a higher color-temperature white are set forth in the following table.

| | angle | gain |
|---|---|---|
| R-Y | 100° | 2.5 |
| G-Y | 237° | 0.75 |
| B-Y | 0° | 2.65 | where R-Y designates the red color-difference signal, G-Y the green one, and B-Y the blue one.

FIG. 3 shows the chromaticity errors for several colors reproduced by the recent phosphors, the higher color-temperature white and the recent color-difference signal demodulators. Referring to FIG. 3, it will be noticed that chromaticity errors are slight as compared with those in FIG. 2. This means that the recent demodulators are competent for correcting chromaticities of reproduced colors. However, they have a serious defect that they produce a large amount of luminance error, especially in the red color-difference signal as shown in FIG. 4. In FIG. 4, the position of the arrow indicates the chromaticity of a reproduced color and the length of the arrow represents the luminance error of the color in percent. A luminance error makes a reproduced color much brighter and less natural than the originally televised one. Moreover, a luminance error causes a deterioration in the sharpness of a reproduced image, because the luminance error, passing through the chrominance channel having a narrow frequency band of about 500 KH$_Z$, covers up a detail of the luminance signal having a wide frequency spectra of more than 3 MH$_Z$. Moreover, a luminance error causes noise or cross-color components to carry a large amount of luminance component through the chrominance channel and to appear in an image as a luminance noise, not just as a chromaticity noise.

This luminance error described above cannot be eliminated by the known linear correcting matrix circuits. In other words, an accurate color reproduction with respect to both chromaticity and luminance is very difficult to achieve by the linear correction provided for the color-difference signal demodulators.

The inventors have considered the characteristics required to reproduce an accurate color without chromaticity and luminance errors, and the theoretical results thereof are set forth in the following description. (These characteristics are essentially non-linear, and the non-linearity of the recent phosphor system is apparent from the following description.)

First of all, there are the colors reproduced by the NTSC specified phosphors and the NTSC specified demodulators, which colors are thought to be the exact ones being televised. In this case, the red, green, and blue light outputs, $R_N$, $G_N$, and $B_N$, can be expressed by:

$$R_N = E_Y^\gamma \{1 + eA_R \cos(\theta - \alpha_R)\}^\gamma$$
$$G_N = E_Y^\gamma \{1 + eA_G \cos(\theta - \alpha_G)\}^\gamma \quad (1)$$
$$B_N = E_Y^\gamma \{1 + eA_B \cos(\theta - \alpha_B)\}^\gamma$$

where $E_Y$ is a luminance signal, e is the amplitude of a carrier chrominance signal normalized by the luminance signal, $\theta$ is the phase of the carrier chrominance signal, $A_R$, $A_G$, and $A_B$ are demodulating gains and $\alpha_R$, $\alpha_G$, and $\alpha_B$ are demodulating phases of the NTSC specified demodulators. The symbol $\gamma$ is the gamma value of a picture tube. The tristimulus values X, Y, and Z for the CIE 1931 standard observer are related to the light outputs by the following equation:

$$\begin{pmatrix} R_N \\ G_N \\ B_N \end{pmatrix} = (T_N) \begin{pmatrix} X \\ Y \\ Z \end{pmatrix} \quad (2)$$

where $(T_N)$ is a 3×3 matrix for transforming (X, Y, Z) to ($R_N$, $G_N$, $B_N$), which is defined by the chromaticity coordinates of the three primaries and the reference white. The transformation matrix (T) for the recent phosphors and the higher color-temperature white can be obtained in the same manner as $(T_N)$, but differs from $(T_N)$ because of the difference of in the chromaticities of the phosphors and the reference white between the two systems.

In order to reproduce a color having the same tristimulus values (X, Y, Z) as in equation (2), the recent phosphor and the higher color temperature white require the following red, green, and blue light outputs, R, G, and B.

$$\begin{pmatrix} R \\ G \\ B \end{pmatrix} = \begin{pmatrix} T \end{pmatrix} \begin{pmatrix} X \\ Y \\ Z \end{pmatrix} \quad (3)$$

Let it be assumed that the three functions $F_R(e,\theta)$, $F_G(e,\theta)$, $F_B(e,\theta)$ are the characteristics required for the color-difference signal demodulators to produce the light outputs R, G, and B from the luminance and carrier chrominance signals. Then the relationships between the light outputs and these functions are:

$$R = E_Y^\gamma \{1 + F_R(e,\theta)\}^\gamma$$

$$G = E_Y^\gamma \{1 + F_G(e,\theta)\}^\gamma \quad (4)$$

$$B = E_Y^\gamma \{1 + F_B(e,\theta)\}^\gamma$$

Analysing equations (1), (2), (3) and (4), the three functions $F_R$, $F_G$ and $F_B$ can be expressed as the functions of the amplitude e and phase $\theta$ of the chrominance signal. Each function will hereinafter be called a "demodulation function".

Figure 5A:
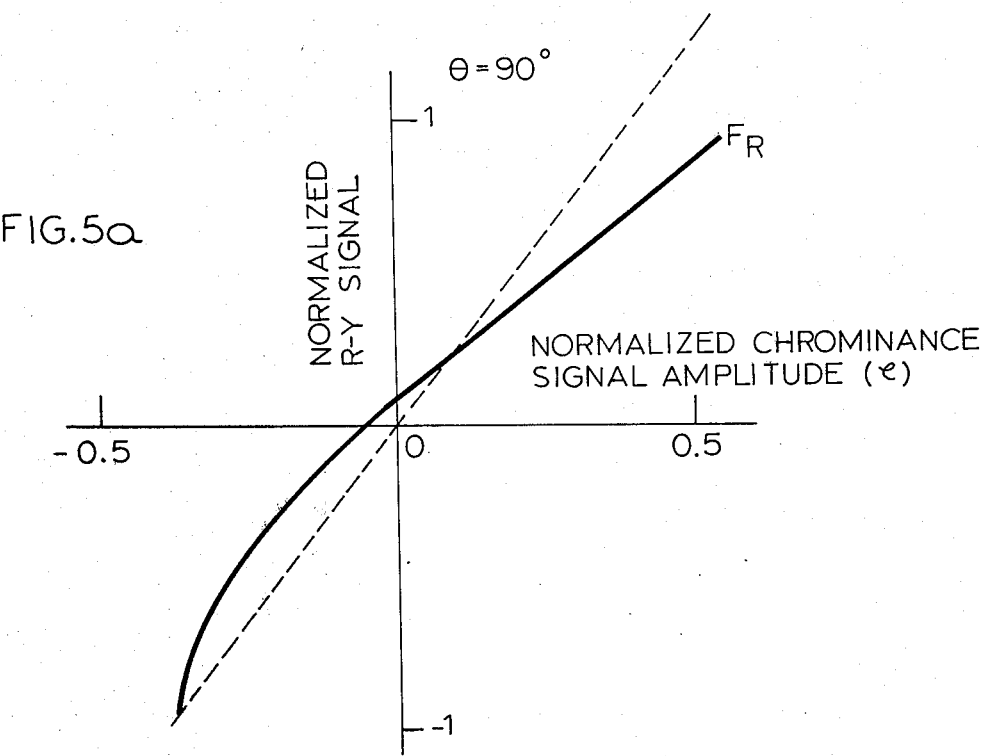
FIGS. 5a–5c are graphs illustrating demodulation characteristics required for color-difference signal demodulators to reproduce an accurate color with respect to both chromaticity and luminance.
Figure 5B:
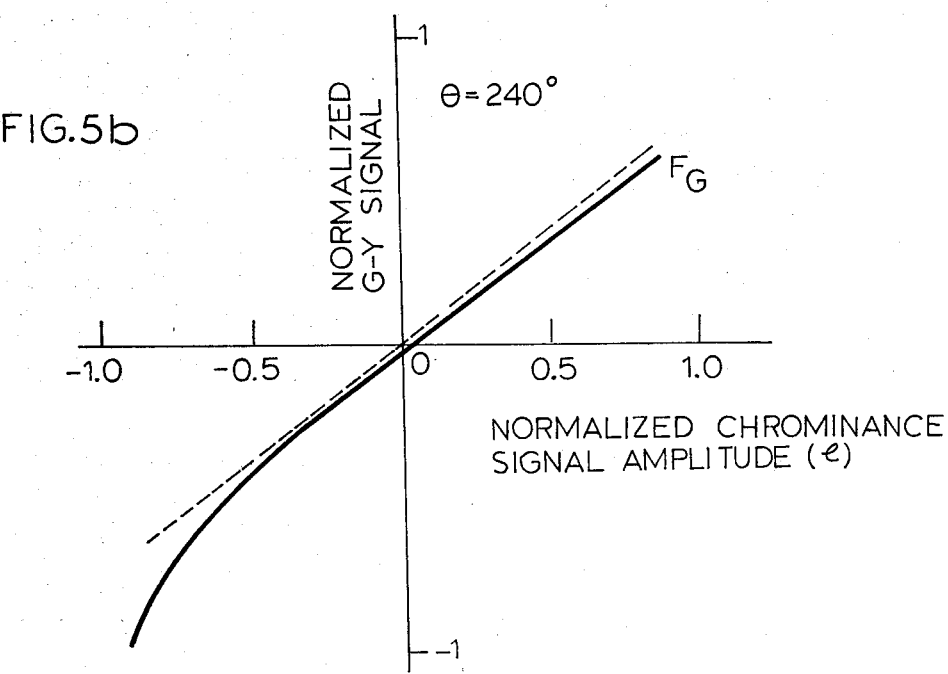
Figure 5C:
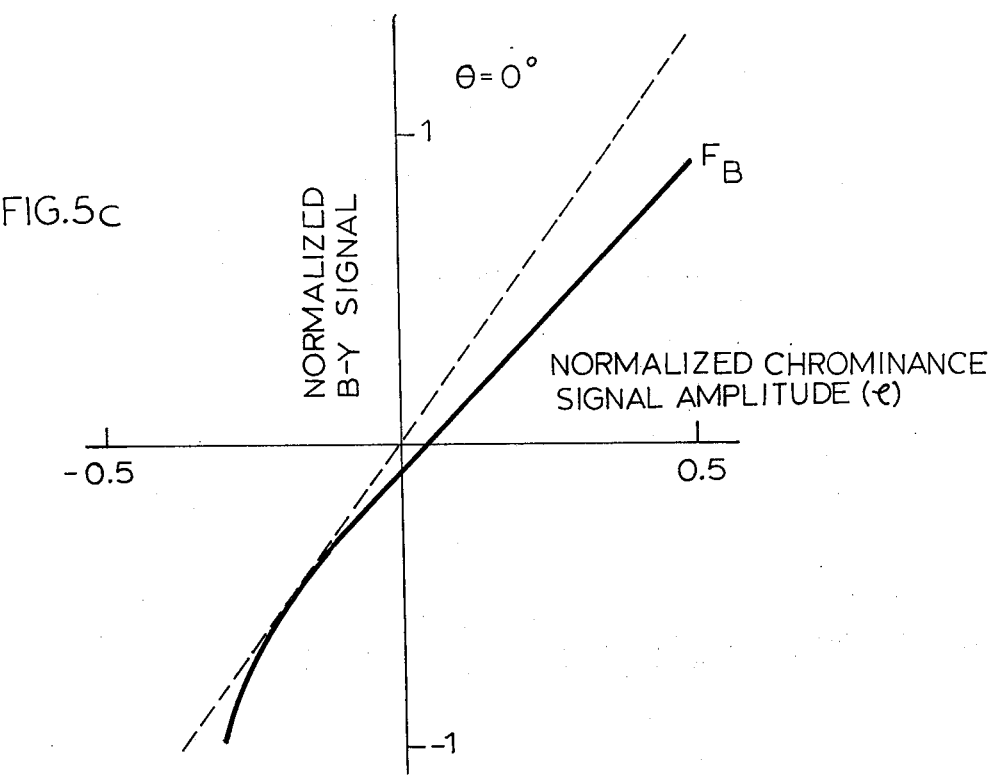

FIGS. 5a, 5b and 5c respectively show the red, green, and blue demodulation functions for the recent phosphors and the higher color-temperature white. In FIGS. 5a–5c the abscissa indicates the amplitude of the carrier chrominance signal e normalized by the luminance signal $E_Y$, and the ordinate indicates the value of the demodulation function. At e=0, each demodulation function has a certain value which corresponds to the shift of the reference white from 9300K+27MPCD to the illuminant C. These demodulation functions indicate that the color-difference signal demodulators should have certain kinds of non-linear characteristics for decreasing both luminance and chromaticity errors.

The characteristic of the recent R-Y demodulators, shown by a dotted straight line in FIG. 5a, greatly exceeds the red demodulation function at a large value of e, although it coincides with the function at the flesh tone typically represented by e=0.133 and $\theta=123°$. The characteristic of the recent B-Y demodulator also exceeds the demodulation function in much the same manner as for R-Y. It will be noticed that the excess amplitude of the color-difference signal causes the luminance errors.

Figure 6:
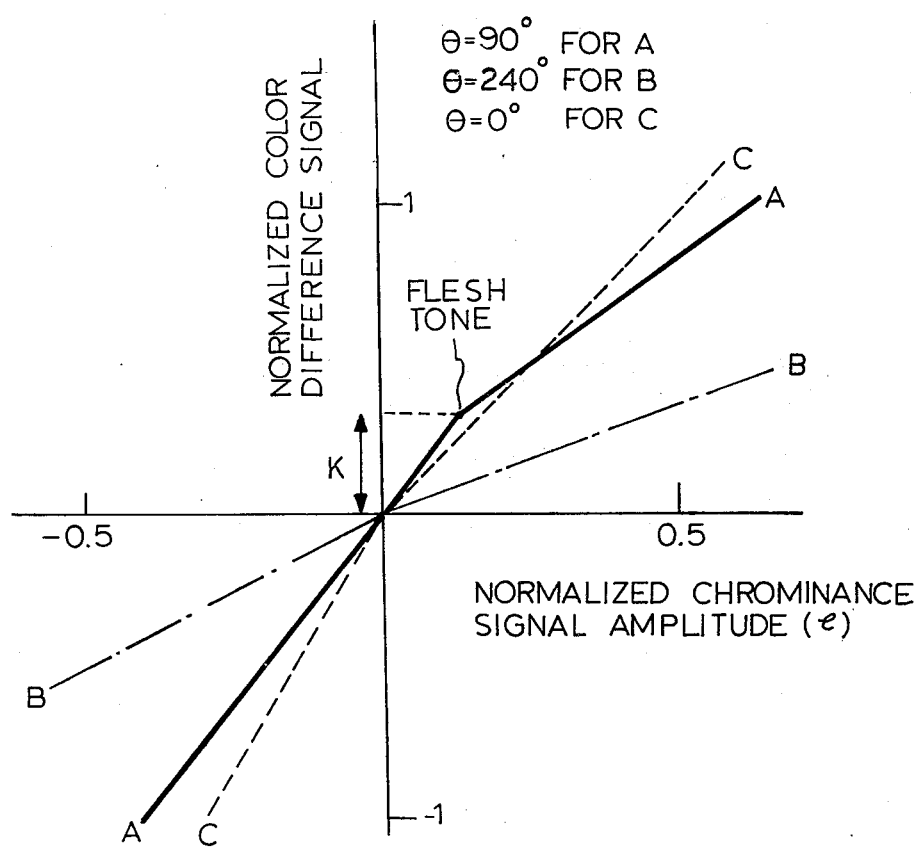
FIG. 6 is a graph showing non-linear characteristics of demodulation obtained by using an embodiment of a color-difference signal modifying apparatus according to this invention which approximates the ideal characteristics shown in FIGS. 5a–5c.

This invention is based on the analytical findings as set forth above. One of the practical ways to approximate the demodulation functions is illustrated in FIG. 6. In FIG. 6, curve A shows the characteristics of a R-Y demodulator containing two different gains, which change at the amplitude for producing the flesh tone, and curves B and C respectively indicate the characteristics of G-Y and B-Y demodulators having a larger gain for a negative color-difference signal than for a positive one.

Figure 7:
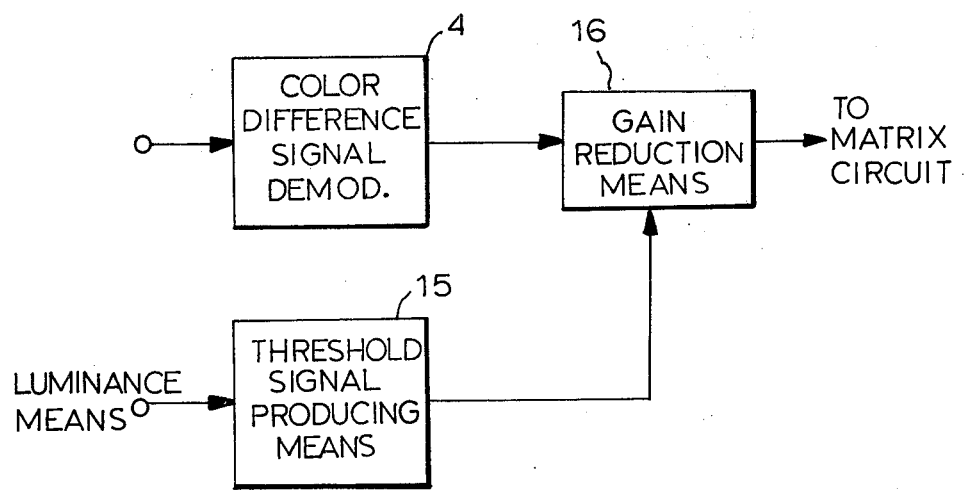
FIG. 7 is a schematic block diagram shown a color-difference signal modifying apparatus according to this invention.

FIG. 7 is a schematic block diagram of a color-difference signal demodulation system using an embodiment of a color-difference signal modifying apparatus according to this invention. A conventional color-difference signal demodulator 4 demodulates the carrier chrominance signal to obtain a color-difference signal, which is fed to a gain reduction means 16. A threshold signal producing means 15 is supplied with the luminance signal, and produces a threshold signal which is proportional to the luminance signal, and feeds the threshold signal to the gain reduction means 16. The gain reduction means 16 decreases the gain so as to remove a specific portion of the excessive color-difference signal above the threshold signal level to achieve characteristic A as shown in FIG. 6. When the color difference signal does not exceed the threshold level, gain reduction means 16 does not alter the color difference signal supplied to the matrix circuit.

Figure 8:
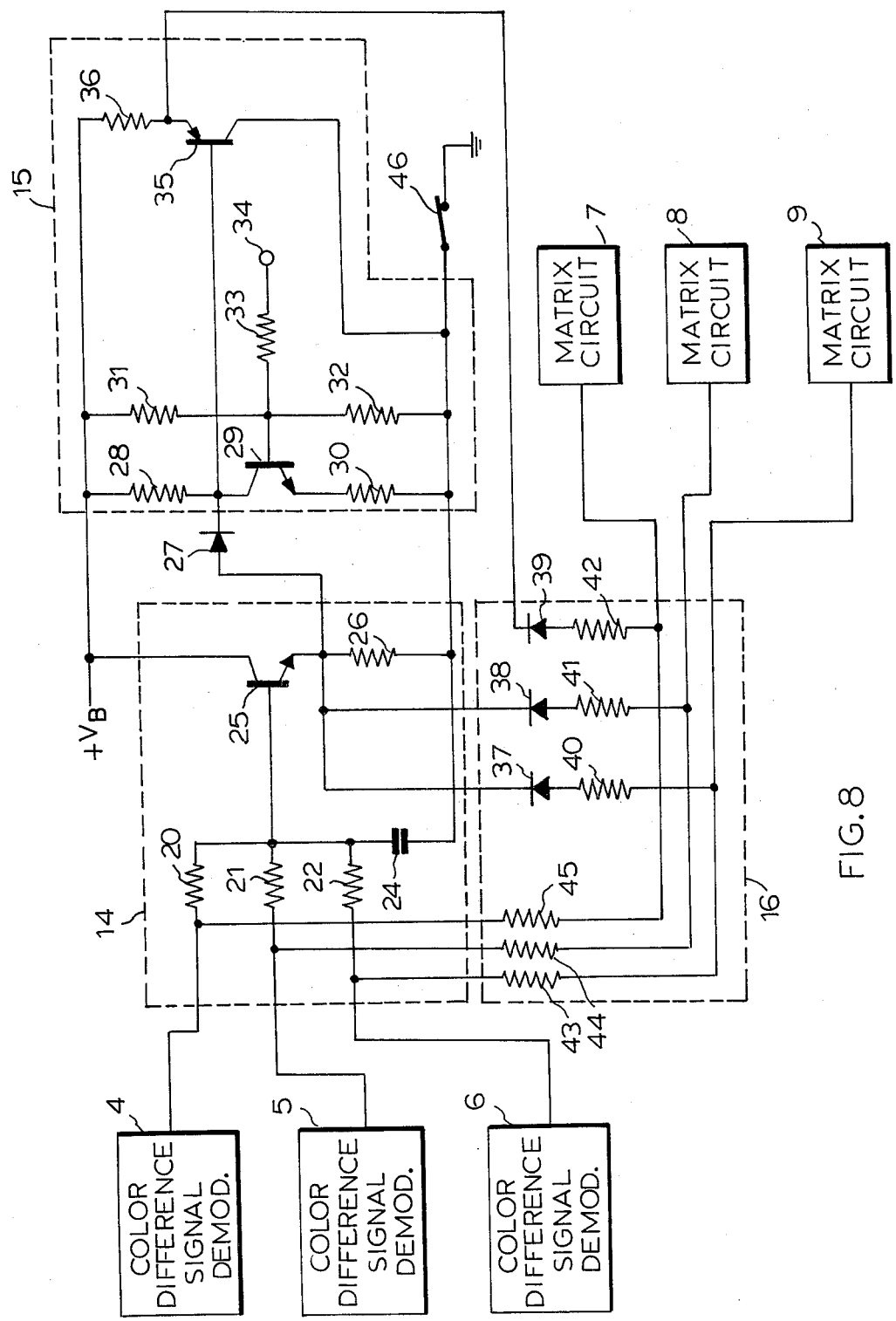
FIG. 8 is a schematic circuit diagram, partially in block form, of a system using an example of a color-difference signal modifying apparatus of this invention for a receiver having the recent phosphors and a higher color-temperature reference white.

FIG. 8 is a schematic circuit diagram, partially in block form, of a system using an embodiment of a color-difference signal modifying apparatus of this invention for the recent phosphors and the higher color-temperature white. The dotted block 14 is a DC voltage producing means. The color-difference signals obtained at the outputs of the conventional color-difference signal demodulators 4, 5 and 6 are added to each other through resistors 20, 21 and 22. If the resistances $r_R$, $r_G$, and $r_B$ of the resistors 20, 21 and 22 satisfy the following equation, the color-difference signals are eliminated at the base of a transistor 25.

$$(r_R/B_R) \sin(\beta_B - \beta_G) = (r_G/B_G) \sin$$
$$(\beta_R - \beta_B) = (r_B/B_B) \sin(\beta_G - \beta_R) \quad (5)$$

where $B_R$, $B_G$ and $B_B$ are the demodulating gains, and $\beta_R$, $\beta_G$, and $\beta_B$ are the demodulating angles, of the conventional demodulators 4, 5, and 6. Consequently, a reference DC voltage which is always equal to the stationary voltage of the demodulators is obtained in spite of the existence of the color-difference signals. The reference DC voltage is applied to the base of the transistor 25. A capacitor 24 connected between the base of the transistor 25 and ground provides a bypass for any transient pulse which otherwise might be applied to transistor 25 due to an abrupt change of a color-difference signal. The transistor 25 is an emitter follower amplifier with an emitter load resistor 26. The voltage at the emitter of the transistor 25 is almost equal to the reference DC voltage.

A diode 37 in the gain reduction means 16 is connected in series with a resistor 40 between the transistor 25 and an input of the blue matrix circuit 9. The cathode of the diode 37 is connected to the emitter of the transistor 25. The output voltage of the B-Y demodulator 6 is applied through a resistor 43 to the input of the blue matrix circuit 9. When the B-Y signal is positive, the diode 37 is in the "ON" state because the cathode of the diode 37 is held at the reference DC voltage. In this case, the positive B-Y signal is divided by the resistors 43 and 40, and fed to the blue matrix circuit 9. The same operation as for the B-Y signal is performed for the G-Y signal by a diode 38, a resistor 41, the green matrix circuit 8, the G-Y demodulator 5 and a resistor 44. When the B-Y signal or the G-Y signal is not positive, then the diodes 37 and 38 do not turn "ON", therefore the difference signals are not altered by the gain reduction means 16.

The dotted block 15 is the threshold signal producing means. A black-positive luminance signal is fed to a terminal 34 and applied through a resistor 33 to the base of a transistor 29. The black-negative luminance signal appears across a collector load resistor 28. The bias circuits of the transistor 29 are comprised of the resistors 30, 31 and 32. A diode 27 between the emitter of the transistor 25 and the collector of the transistor 29 is a threshold limiting means which eliminates blanking pulses contained in the signal at the collector of the transistor 29. The signal at the collector of the transistor 29 is proportional to the luminance signal, and is fed through the emitter follower which comprises a transistor 35 and a resistor 36, to the cathode of a diode 39 in the gain reduction means 16. The signal appearing at the cathode of the diode 39 becomes the threshold signal for the red color-difference signal, R-Y. If the R-Y signal exceeds the threshold signal level which is proportional to the luminance signal, the diode 39 turns "ON" and the excessive color-difference signal is decreased by resistors 42 and 45 to achieve the non-linear characteristic A as shown in FIG. 6. If the R-Y signal does not exceed the threshold signal level, the diode 38 remains "OFF" and resistors 42 and 45 no longer form a voltage divider to decrease the R-Y signal applied to matrix circuit 7.

If the blanking pulses were not removed by the diode 27, the voltage of the cathode of the diode 39 during a blanking period would be much lower than the stationary voltage of the color-difference signal demodulator 4. Therefore, the diode 39 would turn "ON", and the output voltage of the color-difference signal demodulator 4 would be lowered during a blanking period. Usually, in the color-difference signal demodulator, the output voltage during a blanking period is compared with a standard voltage and controlled so as to stay at the stationary voltage. If the output voltage during a blanking period were decreased by the blanking pulse, the control circuit in the color-difference signal demodulator would not work correctly and would harm the white balance of an image seriously.

Figure 9:
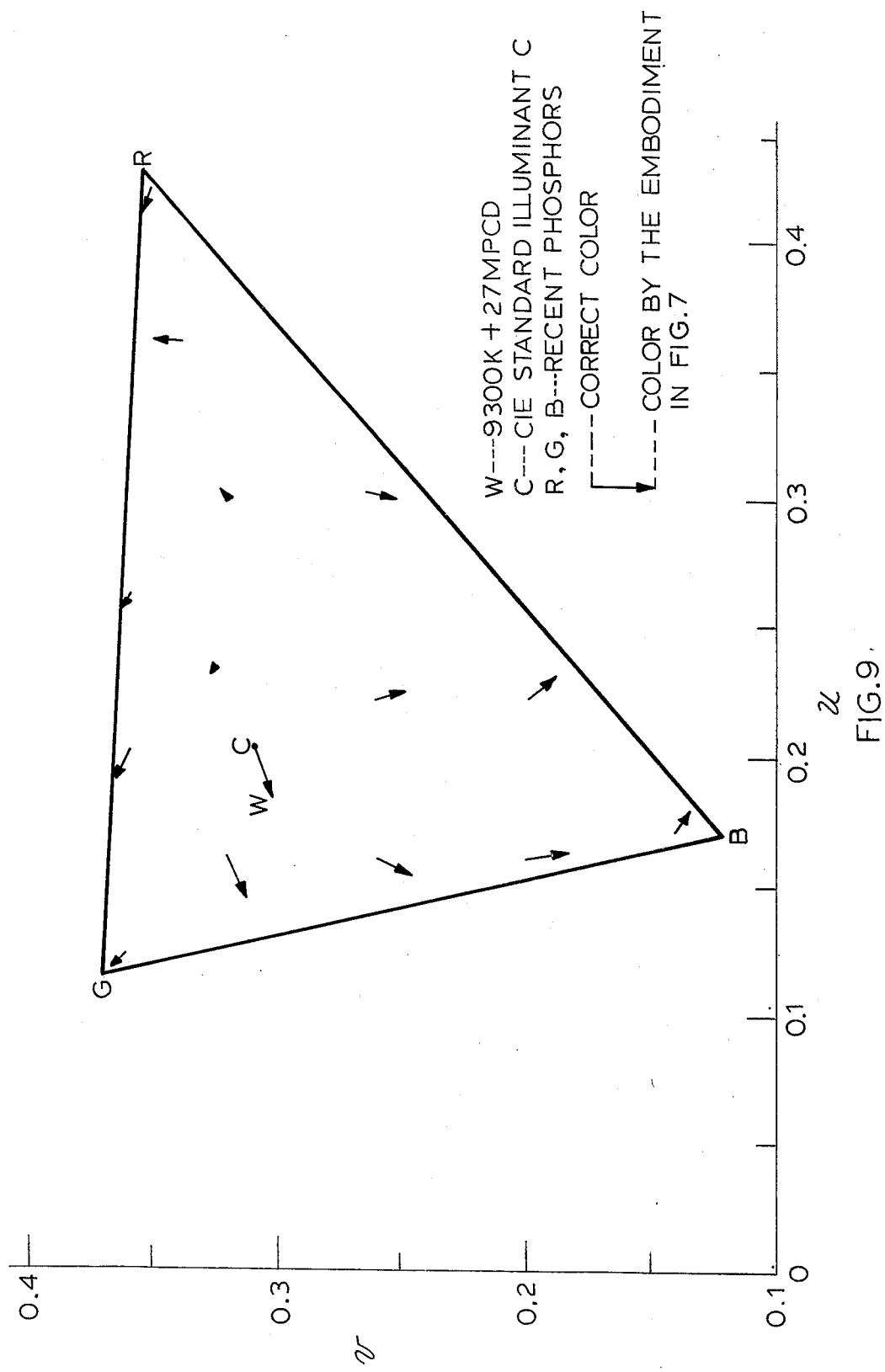
FIG. 9 is a chromaticity diagram showing the chromaticity errors of colors reproduced by the system shown in FIG. 8.
Figure 10:
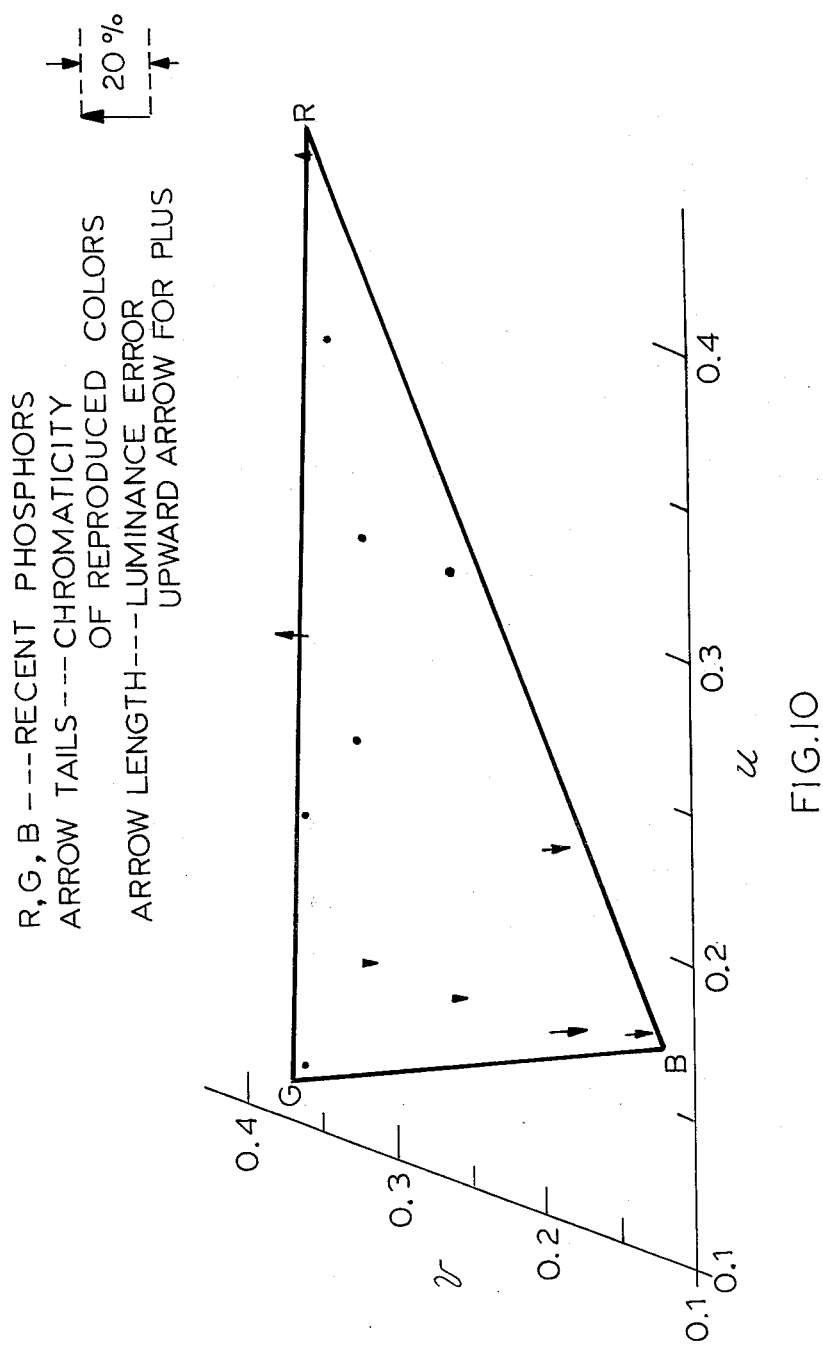
FIG. 10 is a diagram showing the luminance errors of colors reproduced by the system shown in FIG. 8.

Although this example is capable of accurate chromaticity and luminance reproduction, optimum color rendition sometimes depends on viewers' preferences. Therefore, this example has a switch 46 which is able to prohibit the reduction of color-difference signals. When the switch 46 is turned "OFF", the cathode voltages of the diodes 37, 38 and 39 are almost equal to the voltage $+V_B$ so as to keep them in the "OFF" state. The same function would be obtained by disconnecting the diode 37 and the resistor 40, the diode 38 and the resistor 41, and the diode 39 and the resistor 42, but it would need a more complicated switch. Moreover, the switch would be located far from the circuit board and it would need long wires to connect them. The long wires would be very likely to pick up interferences due to the impedances of the resistors 40, 41 and 42. The apparatus of this example is stable, since the switch 46 is in the ground line. Moreover, the switch is a simple switch 46 having only two terminals to control three color-difference signals. FIG. 9 shows the chromaticity errors of colors reproduced in the apparatus of this example. It will be seen that the chromaticity errors are smaller than those of the conventional demodulator as shown in FIG. 3. In addition, FIG. 10 indicates that the luminance errors of reproduced colors in this example are very much smaller than those from the conventional demodulator shown in FIG. 4.

Thus for the description has been limited to the case in which the temperature of the reference white is rather high, 9300K+27MPCD. If the illuminant C is used as the reference white, the proportion constant K shown in FIG. 6 becomes zero and the threshold signal producing means 15 in FIG. 7 can be replaced by other DC voltage producing means. This is a particular case among examples of this invention. With almost the same method as previously described, the demodulation functions are obtained for a combination system of the recent phosphors and the illuminant C as the reference white. Solid lines A, B and C in FIG. 11 respectively show the red, green, and blue demodulation functions for this system. Since these functions are zero at e=0, they can be approximated by dotted lines in FIG. 11, the gains of which change at the origin.

A schematic circuit diagram, partially in block form, of a system using an example of the apparatus of this invention having the characteristics described above is shown in FIG. 12, where the identical blocks and components shown in FIG. 8 are denoted by the same numerals. The threshold signal which is a reference level to decrease the R-Y signal does not vary with the luminance signal but stays at the stationary level of the R-Y signal demodulator 4. This means that the use of the illuminant C as the reference white makes the proportion constant of the threshold signal equal to zero and simplifies the circuitry of apparatus of this invention.

The examples of the apparatus of this invention which are shown in FIG. 8 and FIG. 12 make it possible to achieve accurate color reproduction with respect to chromaticity and luminance. However, there remains a small chromaticity error around the color bluish-green, for instance, green grass and leaves. FIG. 13 shows another example of the apparatus of this invention which further improves color reproduction, especially the chromaticity errors around bluish-green. The dotted block 50 is a reference signal producing means. The signals from the R-Y and B-Y demodulators 4 and 6 are added to each other to obtain a reference signal which is proportional to an inverted G-Y signal. This signal is fed to the base of a transistor 62 which is part of an emitter follower amplifier together with a load resistor 63. The diode 37 and the resistors 40 and 43 are identical with those designated by the same numerals in FIG. 8 and FIG. 12. Therefore, the B-Y signal is decreased, when it exceeds the cathode voltage of the diode 37 which is proportional to the inverted G-Y signal. If this circuit is included in the embodiment shown in FIG. 8 and/or FIG. 12, the color around bluish green is also improved.

As described hereinbefore in detail, this invention is based on the demodulation functions which are the ideal characteristics for color-difference signal demodulators. The ideal characteristics produce a color without chromaticity and luminance errors. The apparatus shown hereinbefore is designed so that the characteristics thereof are such as to achieve approximately the ideal demodulation functions by the use of non-linear operation.

Although the foregoing description is concerned with the NTSC system, the apparatus can be adopted to other color television systems such as the PAL and SECAM systems.

Having described this invention as related to the embodiments shown in the accompanying drawings, it is intended that this invention should not be limited to the details of description, unless otherwise specified, but should rather be construed broadly within its spirit and scope as set out in the following claims.

What is claimed is:

1. A color difference signal modifying apparatus for modifying a color-difference signal in a color television receiver, the apparatus comprising a threshold signal producing means for being supplied with a luminance signal and for producing a threshold signal which is proportional to said luminance signal; a color-difference signal demodulator for producing a color-difference signal; and a gain reduction means coupled to said threshold signal producing means and to said color-difference signal demodulator for reducing the gain of the color-difference signal by at least a portion of the amount of the difference between said color-difference signal and said threshold signal only when said color-difference signal exceeds said threshold signal.

2. A color difference signal modifying apparatus as claimed in claim 1 which further comprises a switch connected between said threshold signal producing means and ground for preventing the reduction of said color-difference signal when said switch is in the "OFF" state.

3. A color difference signal modifying apparatus as claimed in claim 1 wherein said threshold signal producing means comprises a threshold limiting means for eliminating a portion of said threshold signal lower than a stationary level.

4. A color-difference signal modifying apparatus as claimed in claim 1 which further comprises a DC voltage producing means for receiving the outputs of three color-difference signal sources, and for producing a reference DC voltage equal to a stationary voltage of said color-difference signal sources by adding the three outputs, and a signal reduction means for receiving at least one of the color-difference signals other than the red color-difference signal and coupled to said DC voltage producing means and receiving the reference DC voltage for attenuating said other color-difference signal by a portion of the amount of the difference between said other color-difference signal and said reference DC voltage.

5. A color-difference signal modifying apparatus as claimed in claim 1 which further comprises a reference signal producing means for being supplied with the red and blue color-difference signals and for producing a reference signal by adding said two color-difference signals, and a signal reduction means for receiving said blue color-difference signal and coupled to said reference signal producing means for attenuating said blue color-difference signal by a portion of the amount of the difference between said blue color-difference signal and said reference signal.

6. A color-difference signal modifying apparatus as claimed in claim 1 which further comprises a DC voltage producing means for producing a reference DC voltage equal to a stationary voltage of the color-difference signal sources, and a signal reduction means coupled to said DC voltage producing means for receiving at least one of the color-difference signals and for attenuating the said one color-difference signal by a portion of the amount of the difference between said color-difference signal and said reference DC voltage.

* * * * *